United States Patent
Monga et al.

(10) Patent No.: US 9,363,741 B1
(45) Date of Patent: Jun. 7, 2016

(54) MANAGING INTER-NETWORK SET UP OF WIRELESS COMMUNICATION SERVICE

(71) Applicant: Sprint Spectrum L.P., Overland Park, KS (US)

(72) Inventors: Manoj Monga, Olathe, KS (US); Suryanarayanan Ramamurthy, Olathe, KS (US); Sarvana Velusamy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 110 days.

(21) Appl. No.: 14/137,997

(22) Filed: Dec. 20, 2013

(51) Int. Cl.
*H04W 48/18* (2009.01)

(52) U.S. Cl.
CPC .................................... *H04W 48/18* (2013.01)

(58) Field of Classification Search
CPC ..... H04W 48/18; H04W 88/10; H04W 64/00; H04W 80/045; H04W 88/04; H04W 48/20; H04W 4/06; H04W 72/085; H04W 88/06; H04M 3/5116; H04M 11/00; H04M 3/42348; H04M 7/121; H04M 1/2535
See application file for complete search history.

(56) References Cited

U.S. PATENT DOCUMENTS

| 7,720,021 B1 * | 5/2010 | Zhou | H04W 88/04 370/315 |
| 2005/0152396 A1 * | 7/2005 | Pichna | H04L 63/0853 370/467 |
| 2013/0165130 A1 * | 6/2013 | Wu et al. | 455/444 |
| 2013/0183971 A1 * | 7/2013 | Tamaki | H04W 36/0061 455/436 |

FOREIGN PATENT DOCUMENTS

WO   WO 2013172755   * 11/2013   ............... H04W 8/00

OTHER PUBLICATIONS

Lei et al., "Operator Controlled Device-to-Device Communications in LTE-Advanced Networks", IEEE Wireless Communications, Jun. 2012, pp. 96-104.

* cited by examiner

*Primary Examiner* — George Eng
*Assistant Examiner* — Jing Gao (57) ABSTRACT

Disclosed herein is a method and corresponding system for managing inter-network set up of wireless communication service. For instance, a first RAN may manage inter-network set up of wireless communication service for a first UE that is currently served by a second RAN. One embodiment takes the form of a method. The method may involve in response to receiving a first signal from the second RAN, the first RAN directing each UE of a plurality of UEs to broadcast a respective beacon. And the method may involve in response to receiving a second signal from the second RAN, the first RAN causing a particular UE among the plurality of UEs to function as an intermediary for the first RAN to serve the first UE, and the first RAN serving the first UE with the particular UE functioning as the intermediary.

21 Claims, 7 Drawing Sheets

MANAGING INTER-NETWORK SET UP OF WIRELESS COMMUNICATION SERVICE

BACKGROUND

Unless otherwise indicated herein, the materials described in this section are not prior art to the claims and are not admitted to be prior art by their inclusion in this section.

It is increasingly common for people to use devices, referred to in this disclosure as user equipment devices (UEs), to communicate via a radio access network (RAN) with other devices, whether those devices are directly connected to the same RAN or to another network (such as another RAN or a transport network, as examples) to which that RAN directly or indirectly provides access. When the RAN serves a UE, that UE may be able to engage in communications such as voice calls, packet-data sessions, text messaging (e.g., Short Message Service (SMS) messaging), and the like.

Furthermore, the wireless communication between the RAN and each UE is typically bidirectional in nature. An air interface defines what is known as an uplink and a downlink. The uplink may carry communications from each UE to the RAN, and the downlink may carry communications from the RAN to each UE. On both links, the wireless communications are typically formatted in accordance with a wireless communication protocol, examples of which include Long Term Evolution (LTE), Code Division Multiple Access (CDMA), Universal Mobile Telecommunications System (UMTS), WiMAX (IEEE 802.16), Time Division Multiple Access (TDMA), Global System for Mobile Communications (GSM), Wi-Fi (IEEE 802.11), and the like.

In RANs, the entity with which UEs communicate over the air interface is known as a base station or an access node. That entity contains the hardware, antennas, and other components that cooperate to actually conduct the over-the-air (OTA) communication with the UEs on behalf of the RAN.

OVERVIEW

In some situations, a particular RAN may be unable to serve a UE. For example, the UE may request to be served at a particular service level, and the RAN may be unable to serve the UE at that service level. One reason for this may be that the RAN may lack sufficient available resources to serve the UE at the particular service level. Another reason may be the RAN may not be configured to serve the UE at the particular service level.

To provide the UE with the requested service level, in some situations, it may be desirable to have another RAN serve the UE. Unfortunately, however, even when the other RAN may be able to provide the UE with the requested service level, the UE may not be compatible with the other RAN. For example, the UE may not support the air interface protocol that the other RAN would use to provide the UE with the requested service level. Accordingly, in some situations, the RAN and the other RAN may each be unable to serve the UE at the requested service level. As a result, the UE might not be served at the requested service level, and thus the UE might be unable to engage in communication at the requested service level.

Disclosed herein is a method and corresponding system to help overcome these and other concerns. In accordance with this disclosure, a first RAN may manage inter-network set up of wireless communication service for a first UE. In practice, for instance, the first UE may request to be served at a particular service level. The first RAN may be equipped to provide the first UE with that service level, but the first UE may be currently served by the second RAN, and the first UE may not be compatible with the first RAN.

In that context, by way of example, a representative method may involve receiving into the first RAN a first signal from the second RAN indicating a request for the first RAN to serve the first UE that is currently served by the second RAN. The method may further involve in response to receiving the first signal, (i) the first RAN directing a plurality of UEs served by the first RAN to each broadcast a respective beacon, and (ii) the first RAN signaling to the second RAN to direct the second RAN to cause the first UE to scan for at least one of the broadcast beacons. The method may further involve receiving into the first RAN a second signal from the second RAN indicating the first UE detected at least one of the broadcast beacons, the at least one detected broadcast beacon corresponding with a particular UE among the plurality of UEs. And the method may involve, in response to receiving the second signal, (i) the first RAN causing the particular UE to function as an intermediary for the first RAN to serve the first UE, and (ii) the first RAN serving the first UE with the particular UE functioning as the intermediary.

Further, a representative system may include a communication interface, a processing unit, and non-transitory data storage. And the system may include program instructions stored in the data storage and executable by the processing unit to carry out functions such as those described above.

These as well as aspects, advantages, and alternatives will become apparent to those of ordinary skill in the art by reading the following description, with reference where appropriate to the accompanying drawings. Further, it should be understood that this overview and the other description throughout this document are provided by way of example and are not intended to be limiting.

BRIEF DESCRIPTION OF THE DRAWINGS

Various exemplary embodiments are described herein with reference to the following drawings, in which like numerals denote like entities, and in which.

DETAILED DESCRIPTION

I. Introduction

The present methods and systems will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

II. Example Architecture

A. Example Communication System

Figure 1:
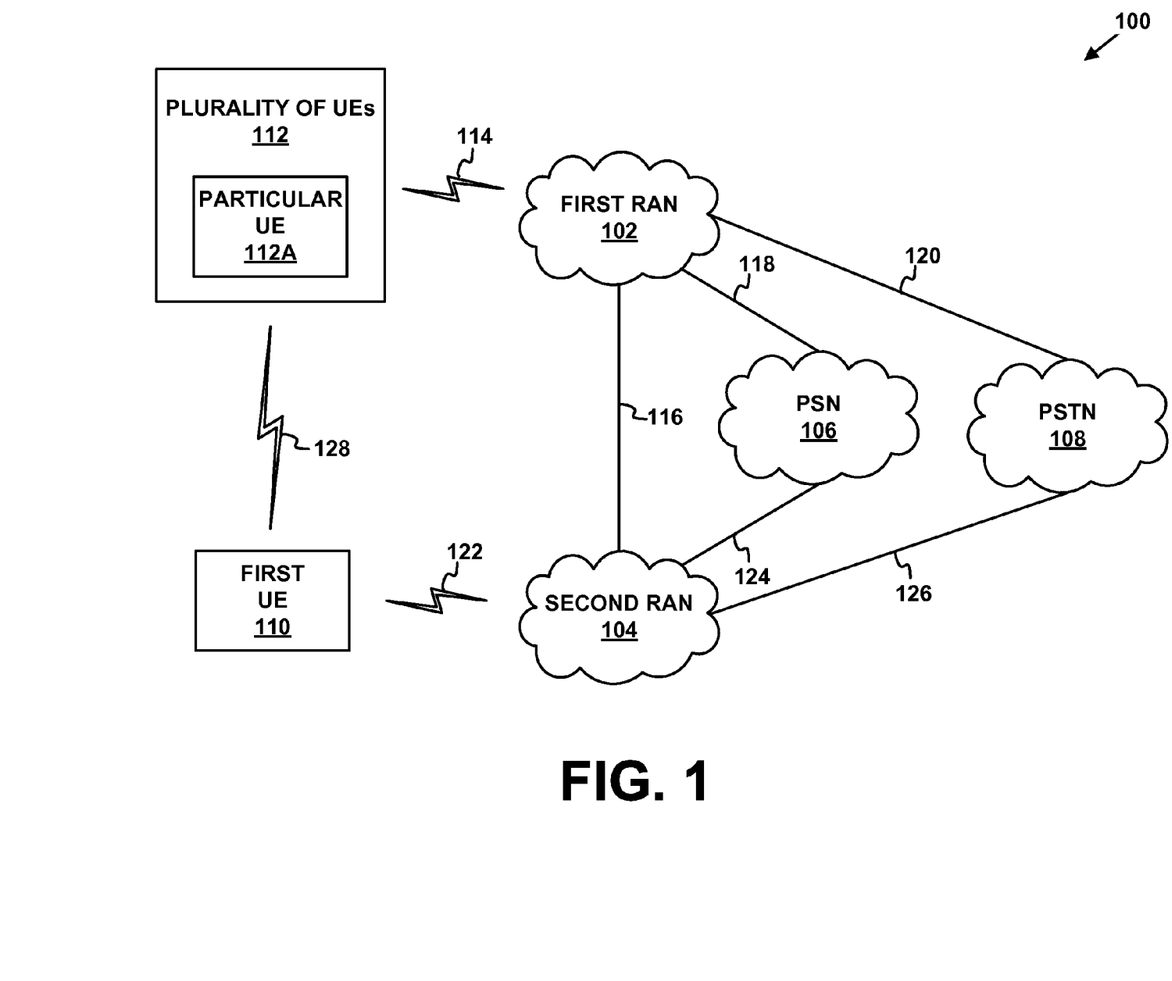
FIG. 1 depicts an example communication system.

Referring to the drawings, FIG. 1 depicts a communication system 100 that includes a first RAN 102, a second RAN 104, a packet-switched network (PSN) 106, a public switched telephone network (PSTN) 108, a first UE 110, and a plurality of UEs 112. Plurality of UEs 112 includes a particular UE 112A. Other entities could be present in addition to and/or instead of one or more entities depicted in FIG. 1, as this arrangement is presented by way of example.

First RAN 102 communicates with each UE among plurality of UEs 112 via a first cellular air interface 114, with second RAN 104 via a communication link 116, with PSN 106 via a communication link 118, and with PSTN 108 via a communication link 120.

Further, second RAN 104 communicates with first UE 110 via a second cellular air interface 122, with PSN 106 via a communication link 124, and with PSTN 108 via a communication link 126. Moreover, particular UE 112A communicates with first UE 110 via a local area network air interface 128. As examples, local area network air interface 128 may include a Wi-Fi air interface, a Bluetooth interface, and the like.

Any or all of the communication links described herein may be bidirectional and may include one or more wired and/or wireless interfaces. Also, there could be one or more routers, switches and/or other devices or networks making up at least part of one or more of each of the communication links described herein.

First RAN 102 may manage inter-network set up of wireless communication service for first UE 110 that is currently served by second RAN 104. For instance, first RAN 102 may direct plurality of UEs 112 to each broadcast a respective beacon, first RAN 102 may cause particular UE 112A to function as an intermediary for first RAN 102 to serve first UE 110, and first RAN 102 may serve first UE 110 with particular UE 112A functioning as the intermediary.

In one aspect, first UE 110 may generate and transmit a request to be served by second RAN 104. The request could be a variety of requests, such as an origination request, a service request, and the like. For example, first UE 110 may generate and transmit a Session Initiation Protocol (SIP) INVITE message to second RAN 104. As another example, first UE 110 may generate and transmit a SMDDP message to second RAN 104.

Further, the request for second RAN 104 to serve first UE 110 may include a request that first UE 110 be served at a particular service level. As one example, the particular service level may include a particular quality of service, such as a particular bit rate. As another example, the particular service level may include a particular type of service, such as a voice over Internet Protocol (VoIP) service.

In response to receiving the request from first UE 110 to be served at the requested service level, second RAN 104 may determine that it is unable to serve first UE 110 at the requested service level. As one example, second RAN 104 may determine that it is unable to serve first UE 110 at the requested service level when second RAN 104 lacks sufficient available resources to serve first UE 110 at the requested service level. As another example, second RAN 104 may determine that it is unable to serve first UE 110 at the requested service level when second RAN 104 is not configured to serve first UE 110 at the requested service level. For instance, second RAN 104 may provide 3G (e.g., CDMA, 1×RTT and 1×EVDO) coverage, and such 3G coverage may be unable to serve first UE 110 at the requested service level.

Further, in response to determining that it is unable to serve first UE 110 at the requested service level, second RAN 104 may send a first signal to first RAN 102 indicating a request for first RAN 102 to serve first UE 110. The first signal could be any type of signal suitable for carrying or indicating the request. In some situations, first UE 110 may generate and transmit a request to be served to second RAN 104, and second RAN 104 may in turn pass that request to first RAN 102. In other situations, in response to determining that it is unable to serve first UE 110 at the requested service level, second RAN 104 may generate and transmit the first signal to first RAN 102.

In some situations, in response to determining that it is unable to serve first UE 110 at the requested service level, second RAN 104 may determine that first UE 110 is equipped to wirelessly communicate over a local area network, such as a Wi-Fi network. For instance, second RAN 104 may determine that first UE 110 is equipped to wirelessly communicate over a local area network by consulting a service profile record for first UE 110. Accordingly, in some such situations, in response to determining that first UE 110 is equipped to wirelessly communicate over a local area network, second RAN 104 may send the first signal to first RAN 102.

In another respect, first RAN 102 may receive the first signal from second RAN 104. And in response to receiving the first signal from second RAN 104, first RAN 102 may direct plurality of UEs 112 to each broadcast a respective beacon, and first RAN 102 may signal to second RAN 104 to direct second RAN 104 to cause first UE 110 to scan for at least one of the broadcast beacons. As one example, the respective beacon may include a service set indicator (SSID).

First RAN 102 may direct plurality of UEs 112 according to any suitable signaling protocol described herein. Further, first RAN 102 may signal to second RAN 104 to direct second RAN 104 to cause first UE 110 to scan for at least one of the broadcast beacons according to any suitable signaling protocol described herein. Further still, second RAN 104 may cause first UE 110 to scan for at least one broadcast beacon by directing first UE 110 to scan for at least one broadcast beacon, and second RAN 104 may direct first UE 110 to scan for at least one broadcast beacon according to any suitable signaling protocol described herein.

In some situations, in response to receiving the first signal, first RAN 102 may determine that first UE 110 is not compatible with first RAN 102. For instance, first RAN 102 may determine that first UE 110 is not compatible with first RAN 102 based on receiving the first signal. As one example, the first signal may indicate that first UE 110 is not compatible with first RAN 102. For instance, first RAN 102 may serve one or more UEs, such as plurality of UEs 112, according to a particular air interface protocol, and the first signal may indicate that first UE 110 may not support that air interface protocol. For instance, first RAN 102 may serve the one or more UEs according to a protocol for 4G (e.g., LTE or WiMAX) coverage, and the first signal may indicate that first UE 110 does not support such a protocol for 4G coverage.

Accordingly, in some such situations, in response to determining that first UE 110 is not compatible with first RAN 102, first RAN 102 may direct plurality of UEs 112 to each broadcast a respective beacon as described above, and first RAN 102 may signal to second RAN 104 to direct second RAN 104 to cause first UE 110 to scan for at least one of the broadcast beacons as described above.

In another aspect, first UE 110 may scan for at least one of the broadcast beacons, and generate and transmit a signal to second RAN 104 indicating that first UE 110 detected at least one of the broadcast beacons, the at least one detected broadcast beacon corresponding with particular UE 112A. The signal could be any signal suitable for indicating that first UE 110 detected at least one of the broadcast beacons, the at least one detected broadcast beacon corresponding with particular UE 112A.

Moreover, in response to the detected broadcast beacon including an SSID, first UE 110 may associate with particular UE 112A, perhaps using well known 802.11 association techniques. Further, first RAN 102 may provide a Wi-Fi security key to first UE 110 to facilitate the association with particular UE 112A. As one example, first RAN 102 may generate and transmit a signal carrying the Wi-Fi security key to second RAN 104, and second RAN 104 may in turn pass that signal to first UE 110. The signal could be any signal suitable for carrying the Wi-Fi security key. In addition, first RAN 102 may provide the Wi-Fi security key to particular UE 112A. As one example, first RAN 102 may generate and transmit another signal carrying the Wi-Fi security to particular UE 112A. The other signal could be any signal suitable for carrying the Wi-Fi security key.

In response to receiving the signal from first UE 110, second RAN 104 may send a second signal to first RAN 102 indicating that first UE 110 detected at least one of the broadcast beacons, the at least one detected broadcast beacon corresponding with particular UE 112A. The second signal could be any type of signal suitable for indicating that first UE 110 detected at least one of the broadcast beacons. In some situations, first UE may generate and transmit the signal indicating that first UE 110 detected at least one of the broadcast beacons, the at least one detected broadcast beacon corresponding with particular UE 112A, and second RAN 104 may in turn pass that signal to first RAN 102. In other situations, in response to receiving the signal from first UE 110 indicating that first UE 110 detected at least one of the broadcast beacons, the at least one detected broadcast beacon corresponding with particular UE 112A, second RAN 104 may generate and transmit the second signal to first RAN 102.

In another aspect, first RAN 102 may receive the second signal from second RAN 104 indicating that first UE 110 detected at least one of the broadcast beacons, the at least one detected broadcast beacon corresponding with particular UE 112A.

In some situations, first UE 110 may detect multiple broadcast beacons, where each detected broadcast beacon of the multiple detected broadcast beacons corresponds with a given UE among multiple UEs (not shown) of plurality of UEs 112. In such situations, the second signal may indicate that first UE 110 detected the multiple broadcast beacons, and in response to receiving the second signal, first RAN 102 may select particular UE 112A among the multiple UEs to function as the intermediary for first RAN 102 to serve first UE 110.

As one example, when first UE 110 detects multiple broadcast beacons, that may mean that the detected broadcast beacon that corresponds with particular UE 112A may be a highest signal strength among the multiple UEs from the perspective of first UE 110. As a result, the second signal may indicate that the detected broadcast beacon that corresponds with particular UE 112A may be the highest signal strength. Accordingly, in response to receiving the second signal, first RAN 102 may select particular UE 112A among the multiple UEs to function as the intermediary for first RAN 102 to serve first UE 110 based on particular UE 112A having the highest signal strength.

As another example, when first UE 110 detects multiple broadcast beacons, that may mean that the detected broadcast beacon that corresponds with particular UE 112A may be proximate to (e.g., in the vicinity of) first UE 110. As a result, the second signal may indicate that the detected broadcast beacon that corresponds with particular UE 112A may be proximate to first UE 110. Accordingly, in response to receiving the second signal, first RAN 102 may select particular UE 112 among the multiple UEs to function as the intermediary for first RAN 102 to serve first UE 110 based on particular UE 112A being proximate to first UE 110.

As still another example, when first UE 110 detects multiple broadcast beacons, that may mean that the detected broadcast beacon that corresponds with particular UE 112A may be most proximate to first UE 110. As a result, the second signal may indicate that the detected broadcast beacon that corresponds with particular UE 112A may be most proximate to first UE 110. Accordingly, in response to receiving the second signal, first RAN 102 may select particular UE 112 among the multiple UEs to function as the intermediary for first RAN 102 to serve first UE 110 based on particular UE 112A being most proximate to first UE 110.

In some situations, when first UE 110 detects the multiple broadcast beacons and first UE 110 detects the broadcast beacon that corresponds with particular UE 112A, first UE 110 may select particular UE 112A among the multiple UEs to function as the intermediary for first RAN 102 to serve first UE 110. First UE 110 may select particular UE 112A among plurality of UEs 112 based on the detected broadcast beacon corresponding with particular UE 112A having the highest signal strength as described above or particular UE 112A being proximate to (or most proximate to) first UE 110 as described above. In some such situations, the second signal received by first RAN 102 may indicate that first UE 110 selected particular UE 112A to function as the intermediary for first RAN 102 to serve first UE 110.

In other situations, when first UE 110 detects the multiple broadcast beacons and first UE 110 detects the broadcast beacon that corresponds with particular UE 112A, second RAN 104 may select particular UE 112A among the multiple UEs to function as the intermediary for first RAN 102 to serve first UE 110. Second RAN 104 may select particular UE 112A among plurality of UEs 112 based on the detected broadcast beacon corresponding with particular UE 112A having the highest signal strength as described above or particular UE 112A being proximate to (or most proximate to) first UE 110 as described above. In some such situations, the second signal received by first RAN 102 may indicate that second RAN 104 selected particular UE 112A to function as the intermediary for first RAN 102 to serve first UE 110.

In still another aspect, in response to receiving the second signal, (i) first RAN 102 may cause particular UE 112A to function as an intermediary for first RAN 102 to serve first UE 110, and (ii) first RAN 102 may serve first UE 110, with particular UE 112A functioning as the intermediary. In at least one embodiment, first RAN 102 may cause particular UE 112A to function as the intermediary for first RAN 102 to serve first UE 110 by (i) directing particular UE 112A to wirelessly communicate with first UE 110 and (ii) directing particular UE 112A to communicate with first RAN 102, so that first RAN 102 may serve first UE 110 via particular UE 112A. As one example, first UE 110 may wirelessly communicate with the particular UE 112A via local area network air interface 128.

In such an embodiment, first RAN 102 may direct particular UE 112A to wirelessly communicate with first UE 110 according to any suitable signaling protocol described herein. In addition, first RAN 102 may direct particular UE 112A to communicate with first RAN 102 according to any suitable signaling protocol described herein.

Moreover, first RAN 102 may cause particular UE 112A to function as the intermediary for first RAN 102 to serve first UE 110 by ensuring sufficient resources (e.g., bearer resources) are available for particular UE 112A to communicate with first RAN 102, so that first RAN 102 may serve first UE 110 via particular UE 112A.

In addition, first RAN 102 may select plurality of UEs 112 among some or all of UEs (not shown) served by first RAN 102 to each broadcast a respective beacon. For instance, first RAN 102 may select plurality of UEs 112 to each broadcast a respective beacon based on each UE among plurality of UEs 112 being equipped to wirelessly communicate with first UE 110. Further, first RAN 102 may determine that each UE among plurality of UEs 112 is equipped to wirelessly communicate with first UE 110 by consulting a service profile record for each UE among plurality of UEs 112.

Moreover, first RAN 102 may select plurality of UEs 112 to each broadcast a respective beacon based on each UE among plurality of UEs 112 being located within a particular distance from first UE 110. Further, first RAN 102 may determine that each UE among plurality of UEs 112 is located within that distance based on a difference between a location of first UE 110 and a location of each UE among plurality of UEs 112. First RAN 102 may determine the location of each UE among plurality of UEs 112 using any variety of techniques for determining the location of UEs, such as trilateration. Further, second RAN 104 may provide information about the location of first UE 110 to first RAN 102 to facilitate the determination of the difference between the location of first UE 110 and the location of each UE among plurality of UEs 112.

B. Example First Radio Access Network (RAN)

Figure 2:
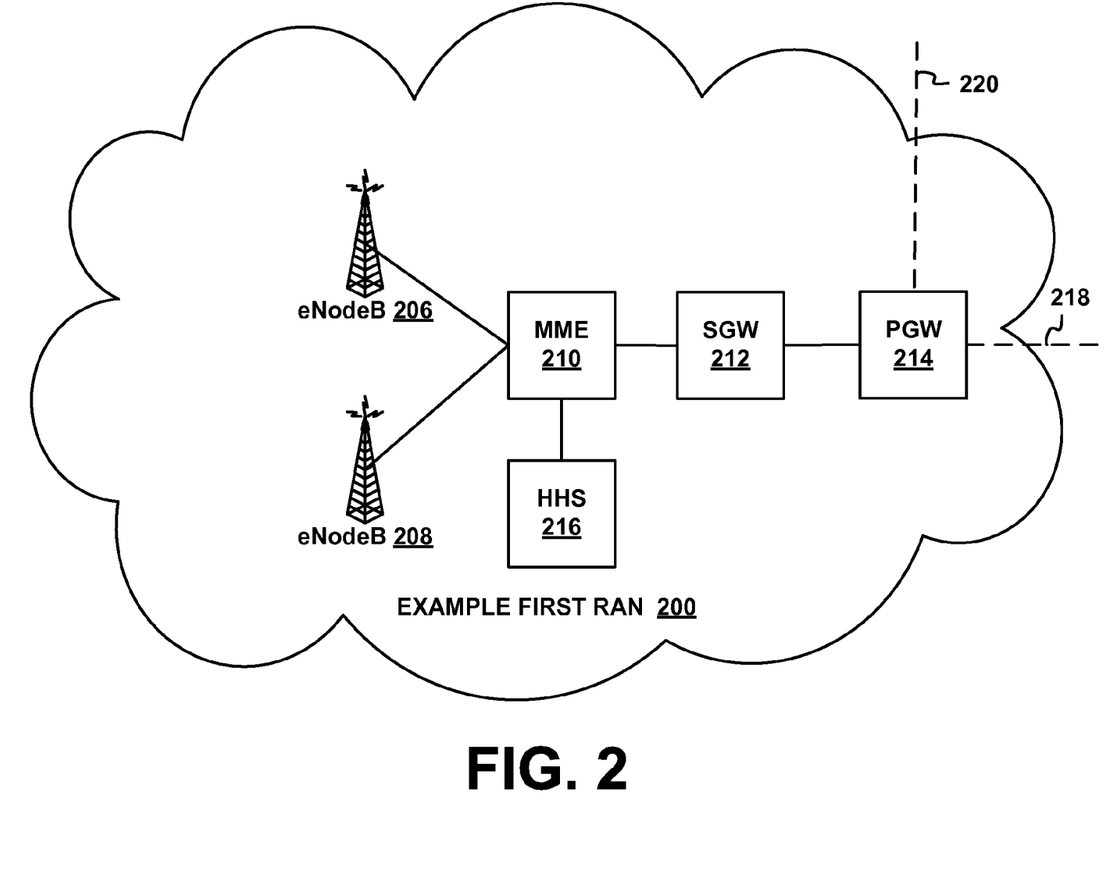
FIG. 2 depicts an example first RAN in the context of the example communication system of FIG. 1.

FIG. 2 depicts an example first RAN 200, where first RAN 200 may represent an arrangement of first RAN 102 of FIG. 1. In the illustrated example, RAN 200 is an LTE RAN. RAN 200 is depicted as including a first eNodeB (e.g., an LTE base station) 206, a second eNodeB 208, a mobile management entity (MME) 210, a serving gateway (SGW) 212, a packet-data network gateway (PGW) 214, and a home subscriber server (HSS) 216. Other entities could be present in addition to and/or instead of one or more entities depicted in FIG. 2, as this arrangement is presented by way of example.

Each UE among plurality of UEs 112 may be served by eNodeB 206 or eNodeB 208. eNodeB 206 and eNode 208 each communicate with MME 210 via a respective communication link, and MME 210 in turn communicates with SGW 212 via a communication link, and with HHS 216 via a communication link. Further, SGW 212 communicates with PGW 214 via a communication link, and PGW 214 in turn communicates with PSN 106 via a communication link 218 and with PSTN 108 via a communication link 220. Communication link 218 may represent communication link 118. Further, communication link 220 may represent communication like 120.

Each of eNodeB 206 and eNodeB 208 generally functions to provide wireless communication service to each UE among plurality of UEs 112 in their respective coverage areas, as described herein, and to bridge air-interface communications with each UE among plurality of UEs 112 on the one hand and backhaul communications with MME 210 on the other hand. And by way of example only, eNodeB 206 and eNodeB 208 may, among other operations, carry out one or more functions described herein as being carried out by an entity of first RAN 102.

MME 210 generally functions to control one or more eNodeBs, and to provide one or more eNodeBs with connections to devices such as SGW 212. SGW 212 in turn may perform various functions such as packet routing and forwarding, mobility anchoring, packet buffering, and the like. Further PGW 214, may facilitate communication between SGW 212 and PSN 106. As one example, PSN 106 may be the Internet. Further still, PGW 214 may facilitate communication between SGW 212 and PSTN 108.

In addition, HHS 216 may serve standard functions in RAN 200, such as managing and storing service profile records and also managing authentication information for one or more UEs, such as plurality of UEs 112. A service profile record that corresponds with a particular UE, such as particular UE 112A, may indicate whether that UE is equipped to wirelessly communicate with first UE 110.

C. Example Second RAN

Figure 3:
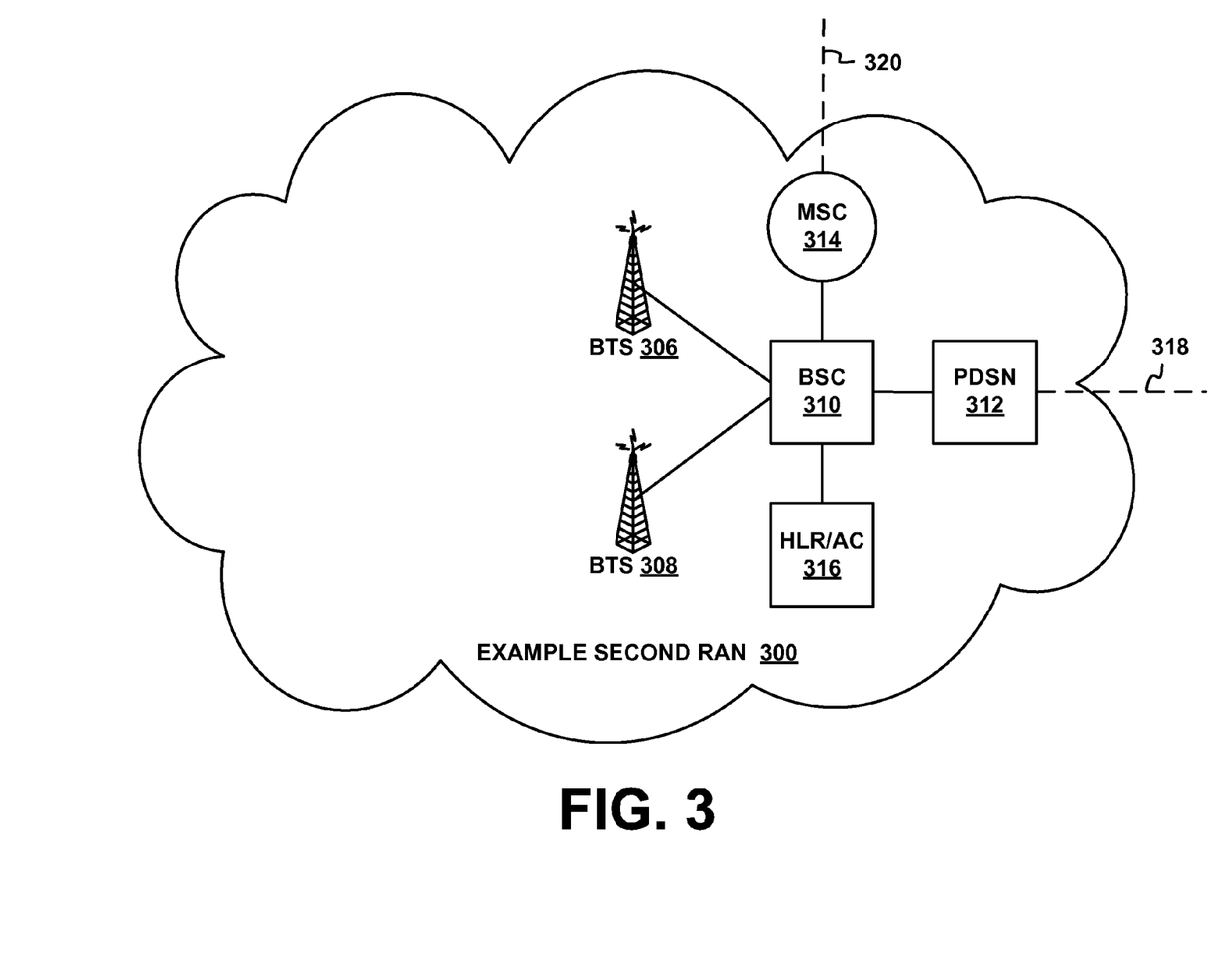
FIG. 3 depicts an example second RAN.

FIG. 3 depicts an example second RAN 300, where second RAN 300 may represent an arrangement of second RAN 104 of FIG. 1. In the illustrated example, RAN 300 is a CDMA RAN. RAN 300 is depicted as including a first base transceiver station (BTS) 306, a second BTS 308, a base station controller (BSC) 310, a packet-data serving node (PDSN) 312, a mobile switching center (MSC) 314, and a home location register and authentication center (HLR/AC) 316. Other entities could be present in addition to and/or instead of one or more entities depicted in FIG. 3, as this arrangement is presented by way of example.

First UE 110 may be served by BTS 306 or BTS 308. BTS 306 and BTS 308 each communicate with BSC 310 via a respective communication link, and BSC 310 in turn communicates with PDSN 312 via a communication link, with MSC 314 via a communication link, and with HLR/AC 316 via a communication link. PDSN 312 communicates with PSN 106 via a communication link 318. Communication link 318 may represent communication link 124. MSC 314 communicates with PSTN 108 via a communication link 320. Communication link 320 may represent communication link 126.

Each of BTS 306 and BTS 308 generally functions to provide wireless communication service to first UE 110 in their respective coverage areas, as described herein, and to bridge air-interface communications with first UE 110 on the one hand and backhaul communications with BSC 310 on the other hand. And by way of example only, BTS 306 and BTS 308 may, among other operations, carry out one or more functions described herein as being carried out by an entity of second RAN 104.

BSC 310 generally functions to control one or more BTSs, and to provide one or more BTSs with connections to devices such as PDSN 314. PDSN 314 in turn generally functions to provide connectivity to PSN 106. MSC 312 generally functions to connect BSCs to circuit-switched networks such as PSTN 108 and serves at least a telephone-switch function to facilitate such connections.

In addition, HLR/AC 316 may serve standard functions in RAN 300, such as managing and storing service profile records and also managing authentication information for one or more UEs, such as first UE 110. A service profile record that corresponds one of the one or more UEs, such as first UE 110, may indicate whether that UE is equipped to wirelessly communicate over a local area network.

D. Example eNodeB

Figure 4:
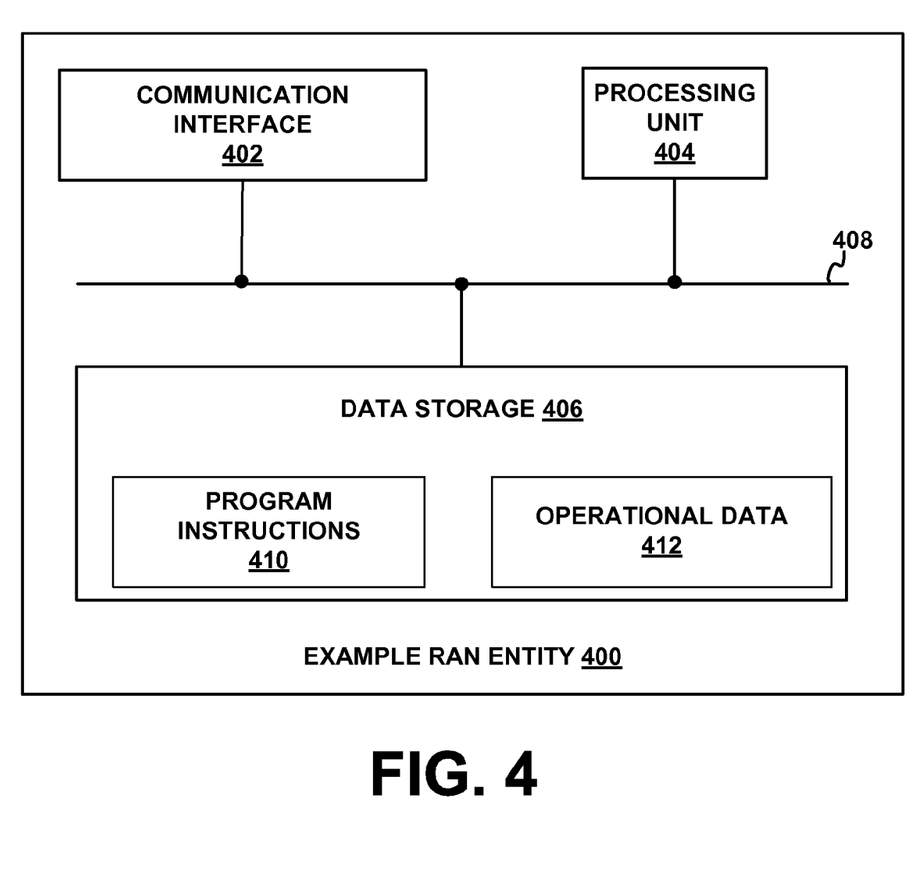
FIG. 4 depicts an example eNodeB.

FIG. 4 depicts an example eNodeB 400, where eNodeB 400 may represent an arrangement of eNodeB 206 and eNodeB 208 in FIG. 2. As shown, entity 400 may include a communication interface 402, a processing unit 404, and data storage 406, all of which may be coupled together by a system bus, network, or other communication mechanism 408.

Communication interface 402 may include one or more interfaces for engaging in wired communication and/or one or more interfaces (e.g., LTE, Wi-Fi) for engaging in wireless communication. Processing unit 404 may comprise one or more general-purpose and/or one or more special-purpose processors, and may be integrated in whole or in part with communication interface 402.

Data storage 406 may comprise one or more volatile and/or non-volatile storage components (such as magnetic, optical, flash, or other non-transitory storage) and may be integrated in whole or in part with processing unit 406. As shown, data storage 406 may hold (e.g., store) program instructions 410 that are executable by processing unit 404 to carry out various functions described herein. Additionally, data storage 406 may hold operational data 412 which comprises information that is collected and stored as a result of the functions carried out by executed program instructions 410. And other configurations are possible as well.

Entity 400 may also have a user interface and/or one or more other components deemed suitable for various contexts. The user interface may include one or more input devices such as a touchscreen, one or more buttons, a microphone, and the like for receiving inputs from users, as well as one or more output devices such as a display, one or more indicator lights, a speaker, and the like for communicating outputs to users.

E. Example UE

Figure 5:
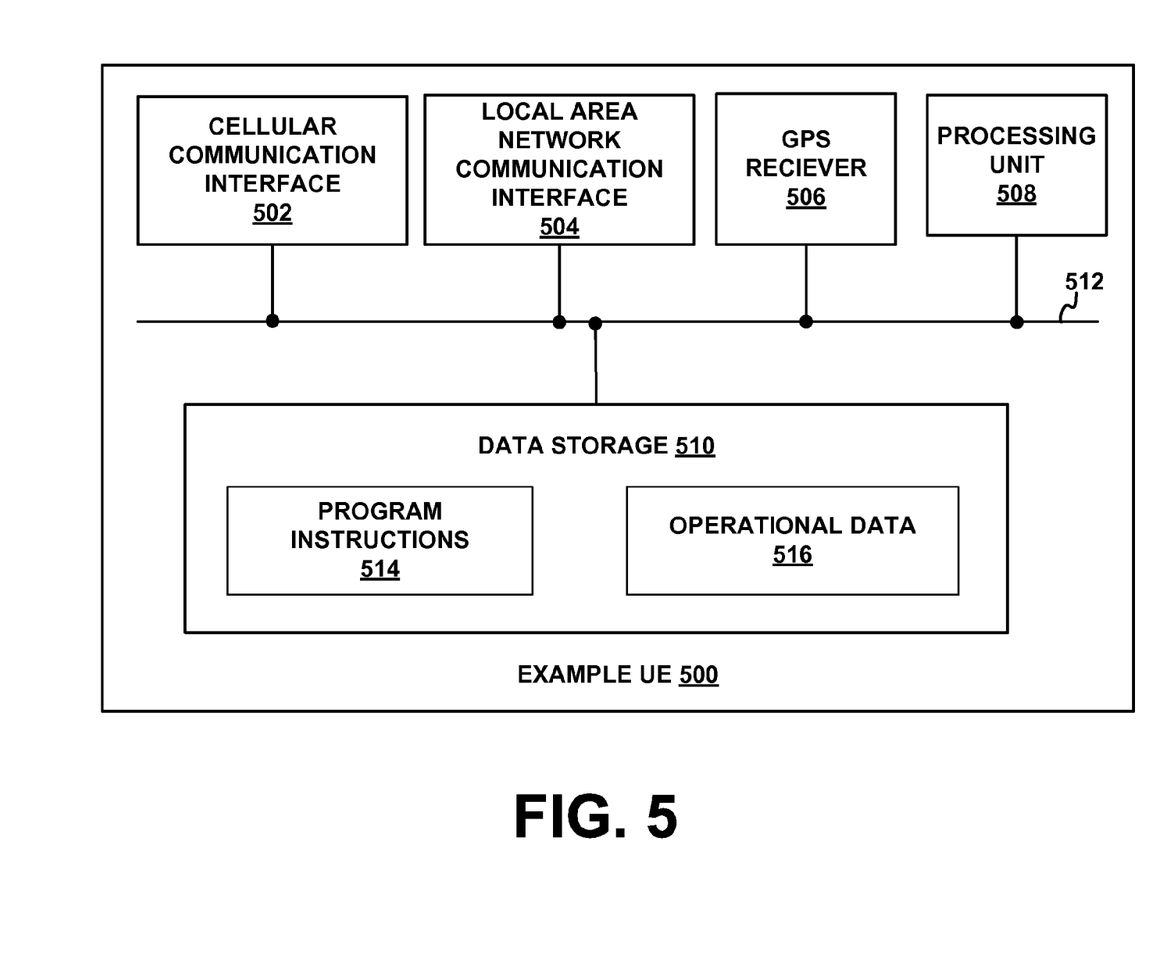
FIG. 5 depicts an example UE.

FIG. 5 depicts an example UE 500, where UE 500 may represent an arrangement of first UE 110 and/or any or all UEs of plurality of UEs 112 (e.g., particular UE 112A). As shown, entity 500 includes a cellular communication interface 502, a local area network communication interface 504, a global positioning system (GPS) receiver 506, a processing unit 508, and data storage 510, all of which may be coupled together by a system bus, network, or other communication mechanism 512.

Cellular communication interface 502 may comprise one or more antennae or one or more chipsets adapted to facilitate communications with one or more base stations over respective air interfaces. As one example, one such chipset could be suited for LTE communication. As another example, one such chipset could be suited for CDMA (e.g., Evolution-Data Optimized (EV-DO)) communication. Cellular communication interface 502 may also or instead be arranged to communicate according to one or more other types of cellular communication (e.g., protocols) mentioned herein and/or any others now known or later developed. In at least one embodiment, cellular communication interface 502 included in first UE 110 may be different than cellular communication interface 502 included in any or all UEs of plurality of UEs 112.

Local area network communication interface 504 may comprise one or more antennae or one or more chipsets adapted to facilitate communications with one or more other UEs over a local area network communication interface, such as local area network communication interface 128. As one example, one such chipset could be an 802.11 chipset. In addition, local area network communication interface 504 may also include a Wi-Fi-based chipset that allows UE 500 to serve as a Wi-Fi access point. Further, GPS receiver 506 may be any known or later developed GPS receiver, suitable for receiving and decoding GPS satellite signals for location and timing purposes, among other purposes.

Processing unit 508 may comprise one or more general-purpose processors and/or one or more special-purpose processors, and may be integrated in whole or in part with cellular communication interface 502 or local area network communication interface 504. Data storage 510 may comprise one or more volatile and/or non-volatile storage components (such as magnetic, optical, flash, or other non-transitory storage), and may be integrated in whole or in part with processing unit 508. As shown, data storage 510 may hold program instructions 514 executable by processing unit 508 for carrying out various user equipment device functions described herein. Additionally, data storage 510 may hold operational data 516 which comprises information that is collected and stored as a result of the functions carried out by executed program instructions 514. And certainly other configurations are possible.

Entity 500 may also have a user interface and/or one or more other components deemed suitable for various contexts. The user interface may include one or more input devices such as a touchscreen, one or more buttons, a microphone, and the like for receiving inputs from users, as well as one or more output devices such as a display, one or more indicator lights, a speaker, and the like for communicating outputs to users.

III. Example Operation

Figure 6:
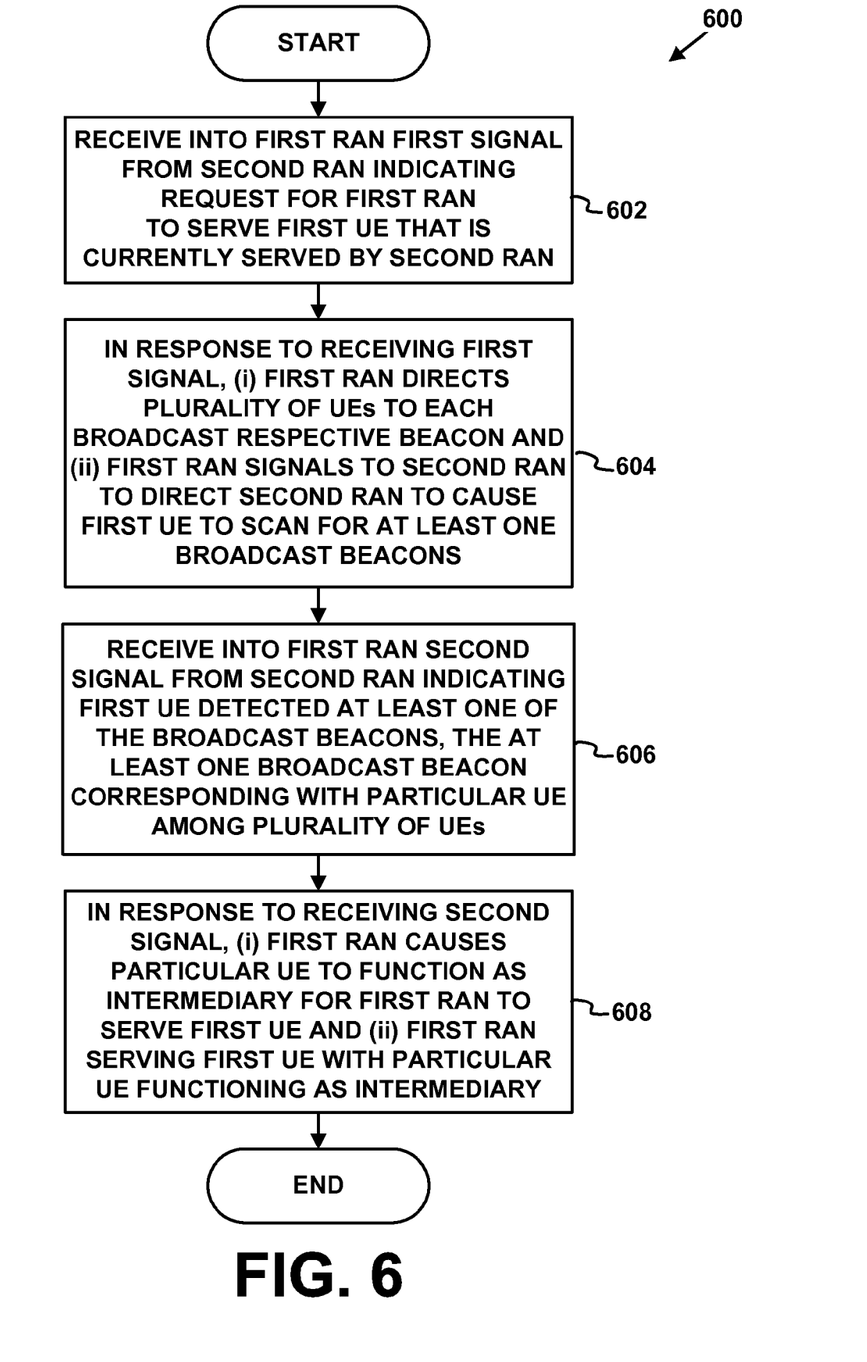
FIG. 6 depicts functions carried out in accordance with at least one embodiment.

FIG. 6 is a flowchart that depicts functions carried out in accordance with at least one embodiment. More particularly, FIG. 6 depicts a method 600. Method 600 could be carried out by various different entities in various different embodiments. In at least one embodiment, method 600 may be carried out by a RAN, such as first RAN 102. Further, method 600 may be carried out by a RAN entity, such as eNodeB 206 and eNodeB 208. And method 600 could be carried out by other entities and/or types of entities as well, as these are listed here by way of example only.

Method 600 begins at block 602 with receiving into a first RAN a first signal from a second RAN indicating a request for the first RAN to serve a first UE that is currently served by the second RAN. The first RAN may receive the first signal from the second RAN the same or similar way as first RAN 102 may receive the first signal from second RAN 104 as described with reference to FIG. 1.

For instance, in at least one embodiment, the request for the first RAN to serve the first UE may include a request that the first UE be served at a particular service level. Moreover, in at least one embodiment, the second RAN may be unable to serve the first UE at the particular service level. Further, in at least one embodiment, the first RAN may serve one or more UEs according to a particular air interface protocol, and the first UE may not support the particular air interface protocol.

Method 600 continues at block 604 with, in response to receiving the first signal, (i) the first RAN directing a plurality of UEs served by the first RAN to each broadcast a respective beacon, and (ii) the first RAN signaling to the second RAN to direct the second RAN to cause the first UE to scan for at least one of the broadcast beacons. In response to receiving the first signal, the first RAN may direct the plurality of UEs served by the first RAN to each broadcast a respective beacon and the first RAN may signal to the second RAN to direct the second RAN to cause the first UE to scan for at least one of the broadcast beacons the same or similar way as the in response to receiving the first signal, first RAN 102 may direct plurality of UEs 112 served by first RAN 102 to each broadcast a respective beacon and first RAN 102 may signal to second RAN 104 to direct second RAN 104 to cause first UE 110 to scan for at least one of the broadcast beacons as described with reference to FIG. 1. For instance, in at least one embodiment, the respective beacon may include an SSID.

Method 600 continues at block 606 with receiving into the first RAN a second signal from the second RAN indicating the first UE detected at least one of the broadcast beacons, the at least one detected broadcast beacon corresponding with a particular UE among the plurality of UEs. The first RAN may receive a second signal from the second RAN indicating the first UE detected at least one of the broadcast beacons the same or similar way as first RAN 102 may receive the second signal from second RAN 104 indicating the first UE detected at least one of the broadcast beacons as described with reference to FIG. 1.

For instance, in at least one embodiment, the first UE may detect multiple broadcast beacons, where each detected broadcast beacon of the multiple detected broadcast beacons corresponds with a given UE among multiple UEs of the plurality of UEs. Further, in at least one such embodiment, when first UE detects the broadcast beacon that corresponds with the particular UE, that beacon may be a highest signal strength among the multiple detected broadcast beacons, and where the first RAN selects the particular UE among the multiple UEs to serve as the intermediary for the first RAN to serve the first UE based on the particular UE having the highest signal strength. Further still, in at least one such embodiment, when first UE detects the broadcast beacon that corresponds with the particular UE, the particular UE may be proximate to first UE, and where the first RAN selects the particular UE among the multiple UEs to function as the intermediary for the first RAN to serve the first UE based on the particular UE being proximate to the first UE.

Method 600 continues at block 608 with in response to receiving the second signal, (i) the first RAN causing the particular UE to function as an intermediary for the first RAN to serve the first UE, and (ii) the first RAN serving the first UE with the particular UE functioning as the intermediary. In response to receiving the second signal, the first RAN may cause the particular UE to function as an intermediary for the first RAN to serve the first UE and the first RAN may serve the first UE with the particular UE functioning as the intermediary the same or similar way as in response to receiving the second signal, first RAN 102 may cause particular UE 112A to function as an intermediary for first RAN 102 to serve first UE 110 and first RAN 102 may serve first UE 110 with particular UE 112A functioning as the intermediary.

For instance, in at least one embodiment, the first RAN causing the particular UE to function as the intermediary for the first RAN to serve the first UE may involve (i) the first RAN directing the particular UE to wirelessly communicate with the first UE and (ii) the first RAN directing the particular UE to communicate with the first RAN, so that the first RAN may serve the first UE via the particular UE.

For instance, in at least one embodiment, the first RAN causing the particular UE to function as the intermediary for the first RAN to serve the first UE may involve the first RAN ensuring sufficient resources are available for the particular UE to communicate with the first RAN, so that the first RAN may serve the first UE via the particular UE.

Any or all of blocks 602, 604, 606, and 608 may be performed in whole or in part by a communication interface, such as communication interface 402, and a processing unit, such as processing unit 404, executing program instructions, such as program instructions 410.

Method 600 may further involve the first RAN selecting the plurality of UEs among some or all of UEs served by the first RAN to each broadcast a respective beacon. The first RAN may select the plurality of UEs to each broadcast a respective beacon the same or similar way as first RAN 102 may select plurality of UEs 112 as described with respect to FIG. 1.

Moreover, in at least one embodiment, the first RAN may select the plurality of UEs to each broadcast a respective beacon based on each UE among the plurality of UEs being equipped to wirelessly communicate with the first UE. Further, in at least one embodiment, the first RAN may select the plurality of UEs to each broadcast a respective beacon based on each UE among the plurality of UEs being located within a particular distance from the first UE.

Figure 7:
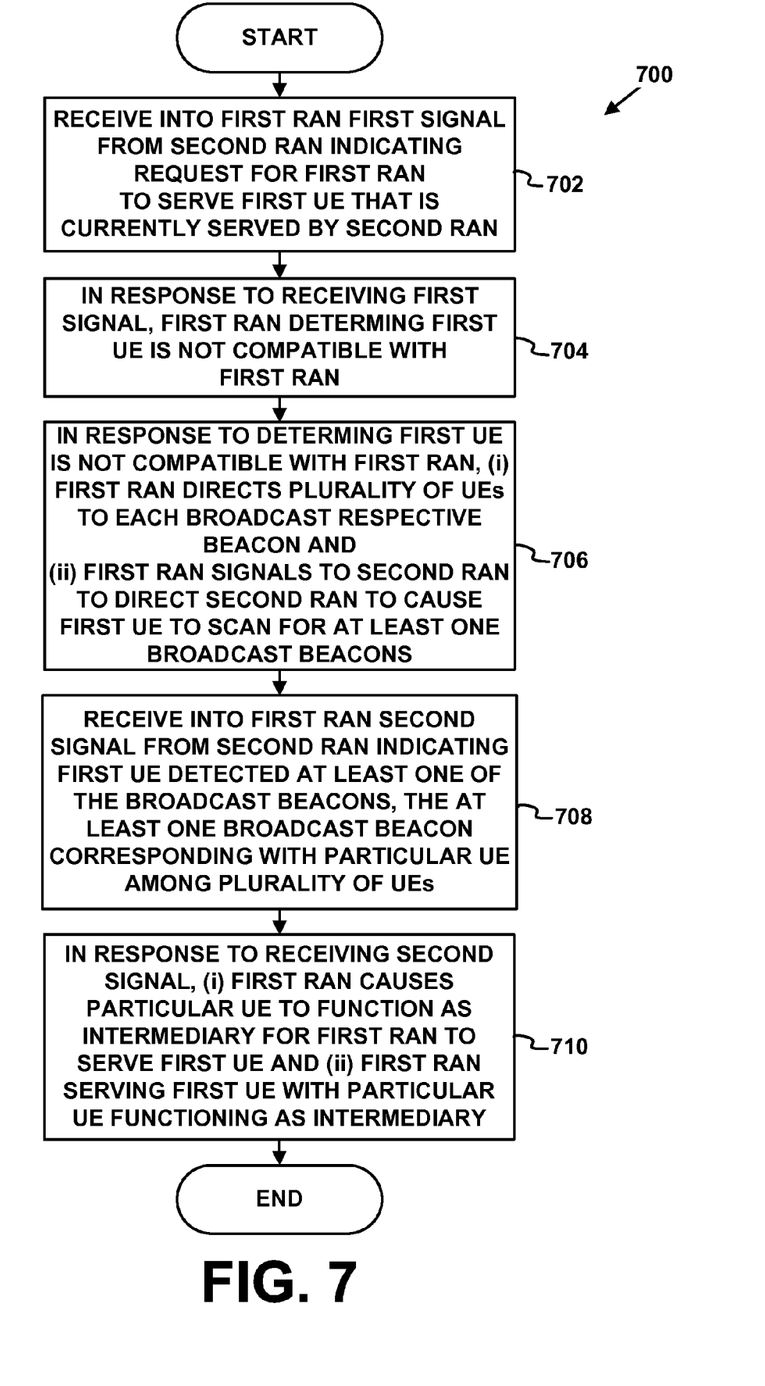
FIG. 7 depicts functions carried out in accordance with at least one other embodiment.

FIG. 7 is a flowchart that depicts functions carried out in accordance with at least one other embodiment. More particularly, FIG. 7 depicts a method 700. Method 700 could be carried out by various different entities in various different embodiments. In at least one embodiment, method 700 may be carried out by a RAN, such as first RAN 102. Further, method 600 may be carried out by an entity of RAN 102, such as eNodeB 206 and eNodeB 208. And method 700 could be carried out by other entities and/or types of entities as well, as these are listed here by way of example only.

Method 700 begins at block 702 with receiving into a first RAN a first signal from a second RAN indicating a request for the first RAN to serve a first UE that is currently served by the second RAN. The first RAN may receive the first signal from the second RAN the same or similar way as first RAN 102 may receive the first signal from second RAN 104 as described with reference to FIG. 1.

For instance, in at least one embodiment, the request for the first RAN to serve the first UE may include a request that the first UE be served at a particular service level. Moreover, in at least one embodiment, the second RAN may be unable to serve the first UE at the particular service level. Further, in at least one embodiment, the first RAN may serve one or more UEs according to a particular air interface protocol, and the first UE may not support the particular air interface protocol.

Method 700 continues at block 704 with, in response to receiving the first signal, the first RAN determining the first UE is not compatible with the first RAN. The first RAN may determine that the first UE is not compatible with the first RAN the same or similar way as first RAN 102 may determine that first UE 110 is not compatible with first RAN 102 as described with reference to FIG. 1.

Method 700 continues at block 706 with, in response to determining that the first UE is not compatible with the first RAN, (i) the first RAN directing a plurality of UEs served by the first RAN to each broadcast a respective beacon, and (ii) the first RAN signaling to the second RAN to direct the second RAN to cause the first UE to scan for at least one of the broadcast beacons. In response to receiving the first signal, the first RAN may direct the plurality of UEs served by the first RAN to each broadcast a respective beacon and the first RAN may signal to the second RAN to direct the second RAN to cause the first UE to scan for at least one of the broadcast beacons the same or similar way as the in response to receiving the first signal, first RAN 102 may direct plurality of UEs 112 served by first RAN 102 to each broadcast a respective beacon and first RAN 102 may signal to second RAN 104 to direct second RAN 104 to cause first UE 110 to scan for at least one of the broadcast beacons as described with reference to FIG. 1. For instance, in at least one embodiment, the respective beacon may include an SSID.

Method 700 continues at block 708 with receiving into the first RAN a second signal from the second RAN indicating the first UE detected at least one of the broadcast beacons, the at least one detected broadcast beacon corresponding with a particular UE among the plurality of UEs. The first RAN may receive a second signal from the second RAN indicating the first UE detected at least one of the broadcast beacons the same or similar way as first RAN 102 may receive the second signal from second RAN 104 indicating first UE detected at least one of the broadcast beacons as described with reference to FIG. 1.

For instance, in at least one embodiment, the first UE may detect multiple broadcast beacons, where each detected broadcast beacon of the multiple detected broadcast beacons corresponds with a given UE among multiple UEs of the plurality of UEs. Further, in at least one such embodiment, when first UE detects the broadcast beacon that corresponds with the particular UE, that beacon may be a highest signal strength among the multiple detected broadcast beacons, and where the first RAN selects the particular UE among the multiple UEs to serve as the intermediary for the first RAN to serve the first UE based on the particular UE having the highest signal strength. Further still, in at least one such embodiment, when first UE detects the broadcast beacon that corresponds with the particular UE, the particular UE may be proximate to first UE, and where the first RAN selects the particular UE among the multiple UEs to function as the intermediary for the first RAN to serve the first UE based on the particular UE being proximate to the first UE.

Method 700 continues at block 710 with, in response to receiving the second signal, (i) the first RAN causing the particular UE to function as an intermediary for the first RAN to serve the first UE, and (ii) the first RAN serving the first UE with the particular UE functioning as the intermediary. In response to receiving the second signal, the first RAN may cause the particular UE to function as an intermediary for the first RAN to serve the first UE and the first RAN may serve the first UE with the particular UE functioning as the intermediary the same or similar way as in response to receiving the second signal, first RAN 102 may cause particular UE 112A to function as an intermediary for first RAN 102 to serve first UE 110 and first RAN 102 may serve first UE 110 with particular UE 112A functioning as the intermediary For instance, in at least one embodiment, the first RAN causing the particular UE to function as the intermediary for the first RAN to serve the first UE may involve (i) the first RAN directing the particular UE to wirelessly communicate with the first UE and (ii) the first RAN directing the particular UE to communicate with the first RAN, so that the first RAN may serve the first UE via the particular UE.

Moreover, in at least one embodiment, the first RAN causing the particular UE to function as the intermediary for the first RAN to serve the first UE may involve the first RAN ensuring sufficient resources are available for the particular UE to communicate with the first RAN, so that the first RAN may serve the first UE via the particular UE.

Any or all of blocks 702, 704, 706, 708, and 710 may be performed in whole or in part by a communication interface, such as communication interface 402, and a processing unit, such as processing unit 404, executing program instructions, such as program instructions 410.

Method 700 may further involve the first RAN selecting the plurality of UEs among some or all of UEs served by the first RAN to each broadcast a respective beacon. The first RAN may select the plurality of UEs to each broadcast a respective beacon the same or similar way as first RAN 102 may select plurality of UEs 112 as described with respect to FIG. 1.

Moreover, in at least one embodiment, the first RAN may select the plurality of UEs to each broadcast a respective beacon based on each UE among the plurality of UEs being equipped to wirelessly communicate with the first UE. Further, in at least one embodiment, the first RAN may select the plurality of UEs to each broadcast a respective beacon based on each UE among the plurality of UEs being located within a particular distance from the first UE.

IV. Conclusion

Exemplary embodiments have been described above. It should be understood, however, that variations from these embodiments are possible, while remaining within the true spirit and scope of the invention.

What is claimed is:

1. A method comprising:
   receiving into a first radio access network (RAN) a first signal from a second RAN indicating a request for the first RAN to serve a first user equipment device (UE) that is currently served by the second RAN;
   in response to receiving the first signal, (i) the first RAN directing a plurality of UEs served by the first RAN to each broadcast a respective beacon, and (ii) the first RAN signaling to the second RAN to direct the second RAN to cause the first UE to scan for at least one of the broadcast beacons;
   receiving into the first RAN a second signal from the second RAN indicating the first UE detected at least one of the broadcast beacons, the at least one detected broadcast beacon corresponding with a particular UE among the plurality of the UEs; and
   in response to receiving the second signal, (i) the first RAN causing the particular UE to function as an intermediary for the first RAN to serve the first UE, and (ii) the first RAN serving the first UE with the particular UE functioning as the intermediary.

2. The method of claim 1, wherein the request for the first RAN to serve the first UE comprises a request that the first UE be served at a particular service level.

3. The method of claim 2, wherein the second RAN cannot serve the first UE at the particular service level.

4. The method of claim 2, wherein the first RAN serves one or more UEs according to a particular air interface protocol, and wherein the first UE does not support the particular air interface protocol.

5. The method of claim 2, wherein the particular service level comprises a particular bit rate.

6. The method of claim 1, further comprising the first RAN selecting the plurality of UEs among some or all of UEs served by the first RAN to each broadcast a respective beacon, wherein the first RAN selects the plurality of UEs to each broadcast a respective beacon based on each UE among the plurality of UEs being equipped to wirelessly communicate with the first UE.

7. The method of claim 1, further comprising the first RAN selecting the plurality of UEs among some or all of UEs served by the first RAN to each broadcast a respective beacon, wherein the first RAN selects the plurality of UEs to each broadcast a respective beacon based on each UE among the plurality of UEs being located within a particular distance from the first UE.

8. The method of claim 1, wherein the respective beacon comprises a service set indicator (SSID).

9. The method of claim 1, wherein the first UE detects multiple broadcast beacons, wherein each detected broadcast beacon of the multiple detected broadcast beacons corresponds with a given UE among multiple UEs of the plurality of UEs.

10. The method of claim 9, wherein when the first UE detects the broadcast beacon that corresponds with the particular UE, wherein the detected beacon that corresponds with the particular UE has a highest signal strength among the multiple detected broadcast beacons, and wherein the first RAN selects the particular UE among the multiple UEs to serve as the intermediary for the first RAN to serve the first UE based on the detected beacon that corresponds with the particular UE having the highest signal strength.

11. The method of claim 9, wherein when the first UE detects the broadcast beacon that corresponds with the particular UE, the particular UE is proximate to the first UE, and wherein the first RAN selects the particular UE among the multiple UEs to serve as the intermediary for the first RAN to serve the first UE based on the particular UE being proximate to the first UE.

12. The method of claim 1, wherein the first RAN causing the particular UE to function as an intermediary for the first RAN to serve the first UE comprises (i) the first RAN directing the particular UE to wirelessly communicate with the first UE and (ii) the first RAN directing the particular UE to communicate with the first RAN, so that the first RAN serves the first UE via the particular UE.

13. A system comprising:
a communication interface;
a processing unit;
non-transitory data storage; and
program instructions stored in the non-transitory data storage and executable by the processing unit to carry out functions comprising:
receiving from a radio access network (RAN) a first signal indicating a request to serve a first user equipment device (UE) that is currently served by the RAN,
in response to receiving the first signal, (i) directing a plurality of UEs to each broadcast a respective beacon, and (ii) signaling to the RAN to direct the RAN to cause the first UE to scan for at least one of the broadcast beacons,
receiving a second signal from the RAN indicating the first UE detected at least one of the broadcast beacons, the at least one detected broadcast beacon corresponding with a particular UE among the plurality of UEs, and
in response to receiving the second signal, (i) causing the particular UE to function as an intermediary between the system and the first UE, and (ii) serving the first UE with the particular UE functioning as the intermediary.

14. The system of claim 13, wherein the request from the RAN to serve the first UE comprises a request that the first UE be served at a particular service level.

15. The system of claim 13, wherein the RAN cannot serve the first UE at the particular service level.

16. The system of claim 14, wherein the plurality of UEs is served according to a particular air interface protocol, and wherein the first UE does not support the particular air interface protocol.

17. The system of claim 14, wherein the particular service level comprises a particular bit rate.

18. The system claim 13, wherein the first UE detects multiple broadcast beacons, wherein each detected broadcast beacon of the multiple detected broadcast beacons corresponds with a given UE among multiple UEs of the plurality of UEs.

19. The system of claim 18, wherein when the first UE detects the broadcast beacon that corresponds with the particular UE, wherein the detected beacon that corresponds with the particular UE has a highest signal strength among the multiple detected broadcast beacons, and wherein the system selects the particular UE among the multiple UEs based on the detected beacon that corresponds with the particular UE having the highest signal strength.

20. The system of claim 13, wherein causing the particular UE to function as an intermediary between the system and the first UE comprises (i) directing the particular UE to wirelessly communicate with first UE and (ii) directing the particular UE to communicate with the system, so that the system serves the first UE via the particular UE.

21. A method comprising:
receiving into a first radio access network (RAN) a first signal from a second RAN indicating a request for the first RAN to serve a first user equipment device (UE) that is currently served by the second RAN;
in response to receiving the first signal, the first RAN determining, based on the received first signal, that the first UE is not compatible with the first RAN;
in response to determining that the first UE is not compatible with the first RAN, (i) the first RAN directing a plurality of UEs served by the first RAN to each broadcast a respective beacon, and (ii) the first RAN signaling to the second RAN to direct the second RAN to cause the first UE to scan for at least one of the broadcast beacons;
receiving into the first RAN a second signal from the second RAN indicating the first UE detected at least one of the broadcast beacons, the at least one detected broadcast beacon corresponding with a particular UE among the plurality of the UEs, wherein the particular UE is served by the first RAN; and
in response to receiving the second signal, (i) the first RAN causing the particular UE to function as an intermediary for the first RAN to serve the first UE, and (ii) the first RAN serving the first UE with the particular UE functioning as the intermediary.

* * * * *